United States Patent [19]

Lentz et al.

[11] Patent Number: 4,925,006
[45] Date of Patent: May 15, 1990

[54] CONVEYOR APPARATUS HAVING MEANS FOR A SHOCK-FREE ARTICLE ACCELERATION

[75] Inventors: Norbert Lentz; Harald Schmidt, both of Essen, Fed. Rep. of Germany

[73] Assignee: Fried. Krupp Gesellschaft mit beschränkter Haftung, Essen, Fed. Rep. of Germany

[21] Appl. No.: 211,554

[22] Filed: Jun. 24, 1988

[30] Foreign Application Priority Data

Jun. 24, 1988 [DE] Fed. Rep. of Germany ....... 3720804

[51] Int. Cl.$^5$ .............................................. B65G 47/31
[52] U.S. Cl. .................................. 198/461; 198/419.3
[58] Field of Search ..................... 198/461, 419.3, 728, 198/732

[56] References Cited

U.S. PATENT DOCUMENTS

| | | | |
|---|---|---|---|
| 3,575,278 | 4/1971 | Hoffmann | 198/461 X |
| 3,721,330 | 3/1973 | Crawford et al. | 198/461 |
| 4,162,382 | 7/1979 | Schalch . | |
| 4,195,723 | 4/1980 | Loewenthal | 198/461 |
| 4,228,888 | 10/1980 | Bruno | 198/461 |
| 4,360,101 | 11/1982 | McGill et al. | 198/461 |
| 4,369,875 | 1/1983 | Schmitz | 198/461 X |
| 4,417,117 | 11/1983 | Opprecht . | |
| 4,682,684 | 7/1987 | Lothman | 198/461 |

FOREIGN PATENT DOCUMENTS

| | | |
|---|---|---|
| 469307 | 12/1928 | Fed. Rep. of Germany . |
| 899765 | 7/1949 | Fed. Rep. of Germany . |
| 1001620 | 4/1955 | Fed. Rep. of Germany . |
| 2323225 | 2/1976 | Fed. Rep. of Germany . |
| 2748910 | 1/1980 | Fed. Rep. of Germany . |
| 3205177 | 8/1983 | Fed. Rep. of Germany . |
| 2820188 | 6/1986 | Fed. Rep. of Germany . |
| 8623146 | 11/1986 | Fed. Rep. of Germany . |

OTHER PUBLICATIONS

"Moderne Stetigförderer", deutsche hebe-und fördertechnik, Aug. 1965 p. 57.

*Primary Examiner*—Robert J. Spar
*Assistant Examiner*—James R. Bidwell
*Attorney, Agent, or Firm*—Spencer & Frank

[57] ABSTRACT

A conveyor apparatus for sequentially advancing articles in a conveying direction comprises two parallel-spaced flexible pulling elements, each trained about an upstream and a downstream end wheel. A plurality of parallel-spaced article advancing bars, each oriented perpendicularly to the conveying direction, are supported by the two pulling elements and extend continuously therebetween. A stationary article supporting surface extends from between the first end wheels parallel to the conveying direction for supporting the articles as they are pushed in the conveying direction by respective article advancing bars. The article supporting surface has a starting location adjacent the upstream end wheels for sequentially receiving the articles to be engaged by an article advancing bar. The starting location is positioned relative to the upstream end wheels such that the article dwelling in the starting location is abutted by the article advancing bar at a moment when an imaginary plane passing through the article advancing bar and containing the rotary axes of the upstream end wheels defines, with the conveying direction, an angle of 45° at the most, whereby a velocity component of the circumferential velocity in the conveying direction is at the most 71% of the circumferential velocity at the moment of contact between the article advancing bar and the article dwelling in the starting location.

5 Claims, 5 Drawing Sheets

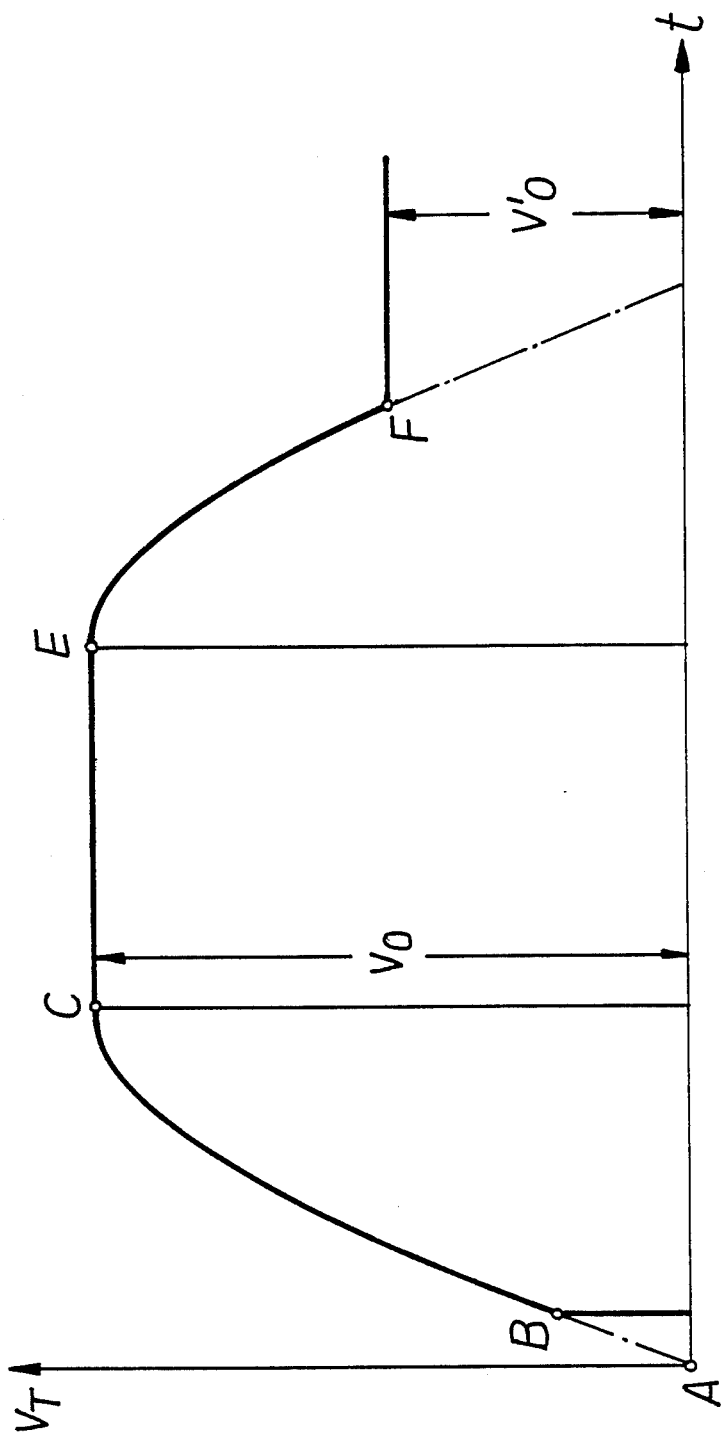

CONVEYOR APPARATUS HAVING MEANS FOR A SHOCK-FREE ARTICLE ACCELERATION

BACKGROUND OF THE INVENTION

1. Field of the Invention

The present invention relates to a conveyor apparatus, particularly for advancing rounded can bodies into a processing station from a station in which the can bodies assume a temporary position of rest with respect to their longitudinal axes. The device includes two synchronously driven, successively disposed advancing arrangements, each being equipped with at least one endless pulling (conveying) mechanism with dogs. Each pulling mechanism includes a flight facing the can bodies and extending parallel to their transporting direction. The flight extends between an upstream and a downstream guide wheel. The upstream disposed first advancing arrangement is operated at a uniform circumferential velocity. The dogs of the first advancing arrangement are arranged perpendicularly to the plane of travel of the pulling mechanism.

2. Discussion of the Prior Art

German Patent No. 2,748,910 (which corresponds to U.S. Pat. No. 4,162,382) discloses a transport device of the above-outlined type for use with an electrical resistance welding machine. The constant transporting speed of the first advancing device is generally higher than the processing (welding) speed. When the dogs of the first advancing arrangement impact on the stationary can body, the edge of the can body may be deformed or damaged by the theoretically infinitely high acceleration. To prevent this damage, the dogs are articulated to a chain as extending fingers thereof. This arrangement provides a certain resiliency, thereby damping the shock of the dog impacting on the can body. However, despite the resiliency of the dogs, in practice the can bodies are accelerated from zero to the full transporting speed by a jerky or jolting motion over a very short path which is in the order of magnitude of one or a few millimeters. This means that very high reaction forces are generated at the edge of the can body. These acceleration and reaction forces increase with the output of the device (that is, the number of can bodies processed per minute) and with the transporting speed so that an increase in the output can result in damage to the edges of the can bodies in spite of the resilient fingers.

In order for the transfer of the can bodies to take place from the first advancing arrangement operated at a higher circumferential velocity to the second advancing arrangement operated at a lower circumferential velocity without the disadvantageous jolts, German Patent No. 2,748,910 discloses providing the second advancing arrangement with pivotal pawls which are actuated by the outline of a guide rail.

German Patent No. 2,820,188 (which corresponds to U.S. Pat. No. 4,417,117) discloses a transporting device having two successively arranged endless chains, each being equipped with dogs. The chains are accelerated by means of a stepping gear assembly from a resting position to a speed around 200 m/min and then are decelerated again to a standstill. The entire velocity cycle is approximately sinusoidal. While in this prior art device the rounded can body is moved smoothly due to the gradual acceleration, and thus the edges of the can bodies are not likely to be damaged, the output of the transporting device cannot be significantly increased, because of the masses (such as the transporting chain, the dogs, the chain wheels and the gear components) which must be accelerated.

German Offenlegungsschrift (non-examined published patent application) No. 3,205,177 discloses a drive device for assembly pallets in transfer tracks in which the preliminary end position of a pallet is determined by the carrier of a first circulating chain at the rear reversal point, and the resumption of the movement of the pallet after the halt is effected by the carrier of a second chain at the front reversal point.

German Auslegeschrift (examined published application) No. 2,323,225 discloses a chain advancing mechanism where blank stacks are positioned against a stop by means of vertically arranged transporting fingers of a rotating chain drive arrangement at the rear deflection point.

German Patent No. 899,765 discloses a transporting device for container handling machines where the containers are moved at a sinusoidal velocity between two plate or belt conveyors by means of transporting fingers disposed at a rotating disc wheel.

SUMMARY OF THE INVENTION

It is an object of the present invention to provide an improved device of the above-outlined type for transporting articles specifically can bodies or tubular shaped blanks, without damage from their rest position and the output of the machine can be increased.

This object and others to become apparent as the specification progresses, are accomplished by the invention, according to which, briefly stated, the conveyor apparatus for sequentially advancing articles in a conveying direction comprises two parallel-spaced flexible pulling elements, each trained about an upstream and a downstream end wheel. A plurality of parallel-spaced article advancing bars, each oriented perpendicularly to the conveying direction, are supported by the two pulling elements and extend continuously therebetween. A stationary article supporting surface extends from between the first end wheels parallel to the conveying direction for supporting the articles as they are pushed in the conveying direction by respective article advancing bars. The article supporting surface has a starting location adjacent the upstream end wheels for sequentially receiving the articles to be engaged by an article advancing bar. The starting location is positioned relative to the upstream end wheels such that the article dwelling in the starting location is abutted by the article advancing bar at a moment when an imaginary plane passing through the article advancing bar and containing the rotary axes of the upstream end wheels defines, with the conveying direction, an angle of 45° at the most, whereby a velocity component of the circumferential velocity in the conveying direction is at the most 71% of the circumferential velocity at the moment of contact between the article advancing bar and the article dwelling in the starting location.

Thus, according to the invention, at the moment a can advancing bar or dog arrives into engagement with a rear part of the stationary can body, the velocity component of the dog in the horizontal transporting direction is designed to be no more than 71% of its circumferential velocity (which corresponds to the transporting speed). This initial contacting position of the dogs corresponds to an angular position of 45° of a plane containing the longitudinal center line of the dog and the rotary axes of the upstream guide wheels, with respect to the direction of conveyance. The horizontal velocity component (in the transporting direction) decreases if the dogs impact the can when the angle is smaller. If, optimally, the dog contacts the article when the plane is horizontal, then the above-defined angle and thus the horizontal velocity component equal zero. Experience has shown that the smaller the velocity component in the transporting direction, the less the shock exerted by the dog on the can body in a rest position. A contacting of the can bodies is possible at this location because of the throughgoing, continuous configuration of the dogs which, as noted earlier, extend from one pulling means to the other. Advantageously, the upstream guide wheel is arranged such that a minimum safety distance of about 1 mm is always maintained between the can body in its position of rest and the dog when it is disposed in the above-defined plane. By virtue of the throughgoing configuration of the dogs (can advancing bars) of the first advancing arrangement, a greater stability of the first advancing arrangement is achieved.

As the dogs move around the second (downstream) guide wheel after their horizontal travel, their velocity component in the transporting direction decreases. At a particular angular position, this velocity component equals the transporting speed of a second advancing arrangement situated downstream of the described conveyor structure. In order for the can body to be transferred to the second advancing arrangement without shock, the dog of the first advancing arrangement must be disposed precisely below the dog of the second advancing arrangement when the dog of the first advancing arrangement is in the above-described angular position. Additionally, the axis of rotation of the first (upstream) guide wheel of the second advancing arrangement should be in alignment with and disposed vertically above this transfer location. To achieve these positioning objectives, the apparatus is, according to a further feature of the invention, provided with adjusting means for shifting either or both advancing arrangements with respect to one another, parallel to the conveying direction.

BRIEF DESCRIPTION OF THE DRAWINGS

FIG. 5 is a diagram illustrating a velocity/time curve pertaining to moving components of the preferred embodiment.

DESCRIPTION OF THE PREFERRED EMBODIMENT

Figure 1:
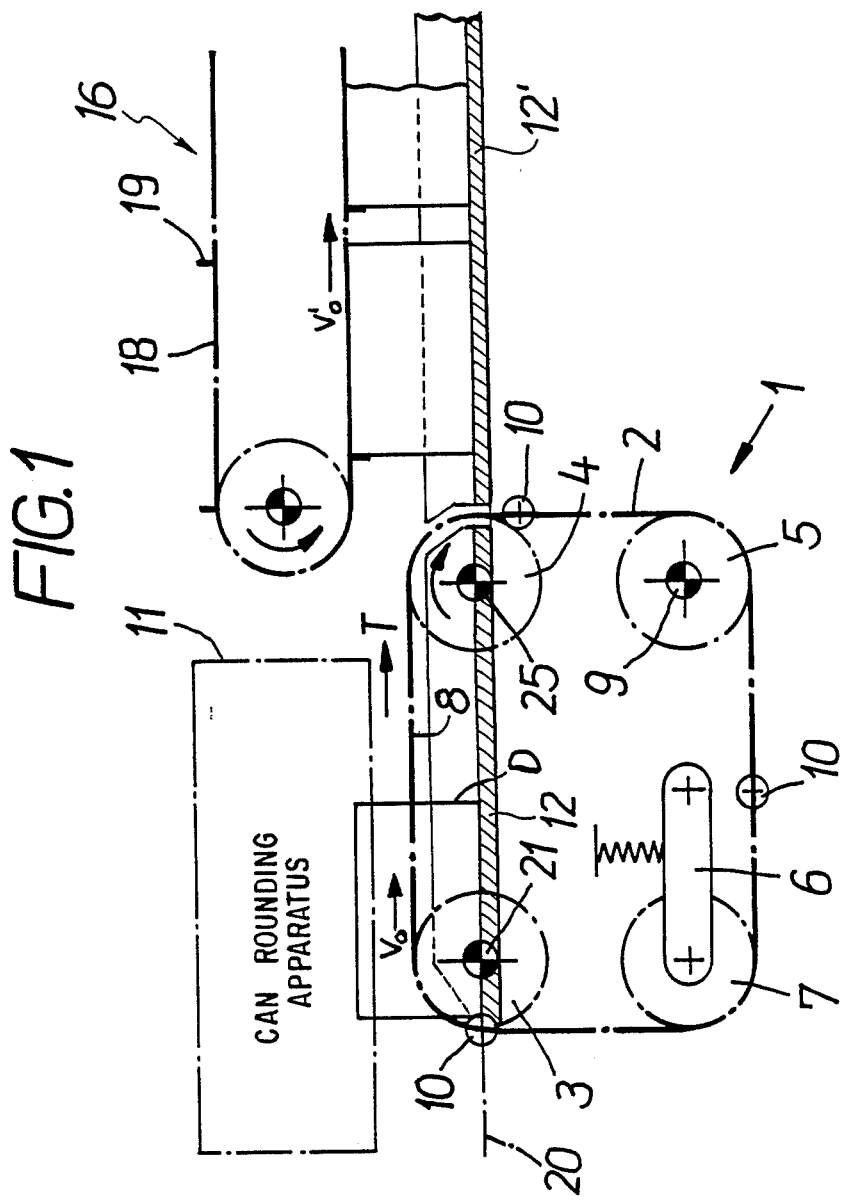
FIG. 1 is a schematic side view of a transporting device according to a preferred embodiment of the invention.

Turning to FIG. 1, there is schematically shown a transporting device according to the invention for advancing rounded can bodies D. The transporting device includes a first advancing arrangement 1 which is composed of two identical endless chains 2 (only one being shown in FIG. 1). The chains 2 each revolve around two upper guide wheels 3 and 4, a drive wheel 5 and a tension wheel 7 mounted on a spring-tensioned rocker arm 6. The chains 2 each have an upper run 8 which extends between the first (upstream) guide wheel 3 and the second (downstream) guide wheel 4 when viewed in the transporting direction T of the can bodies D. The upper run 8 is parallel with the transporting direction T of the can bodies D. From the second guide wheel 4 to the drive wheel 5, the chains 2 move downward perpendicular to the upper run 8. From the drive wheel 5 to the tension wheel 7, the chains 2 move substantially parallel to the upper run 8 but in the opposite direction and from the tension wheel 7 back to the first guide wheel 3, the chains 2 move upward, perpendicular to the upper run 8. In order for both of the chains 2 to move synchronously, the drive wheels 5 are provided with a common drive shaft 9.

The first advancing arrangement 1 is equipped with uniformly spaced cylindrical dogs or article advancing bars 10 which extend between the two chains 2 and are carried thereby at opposite bar ends.

Figure 4:
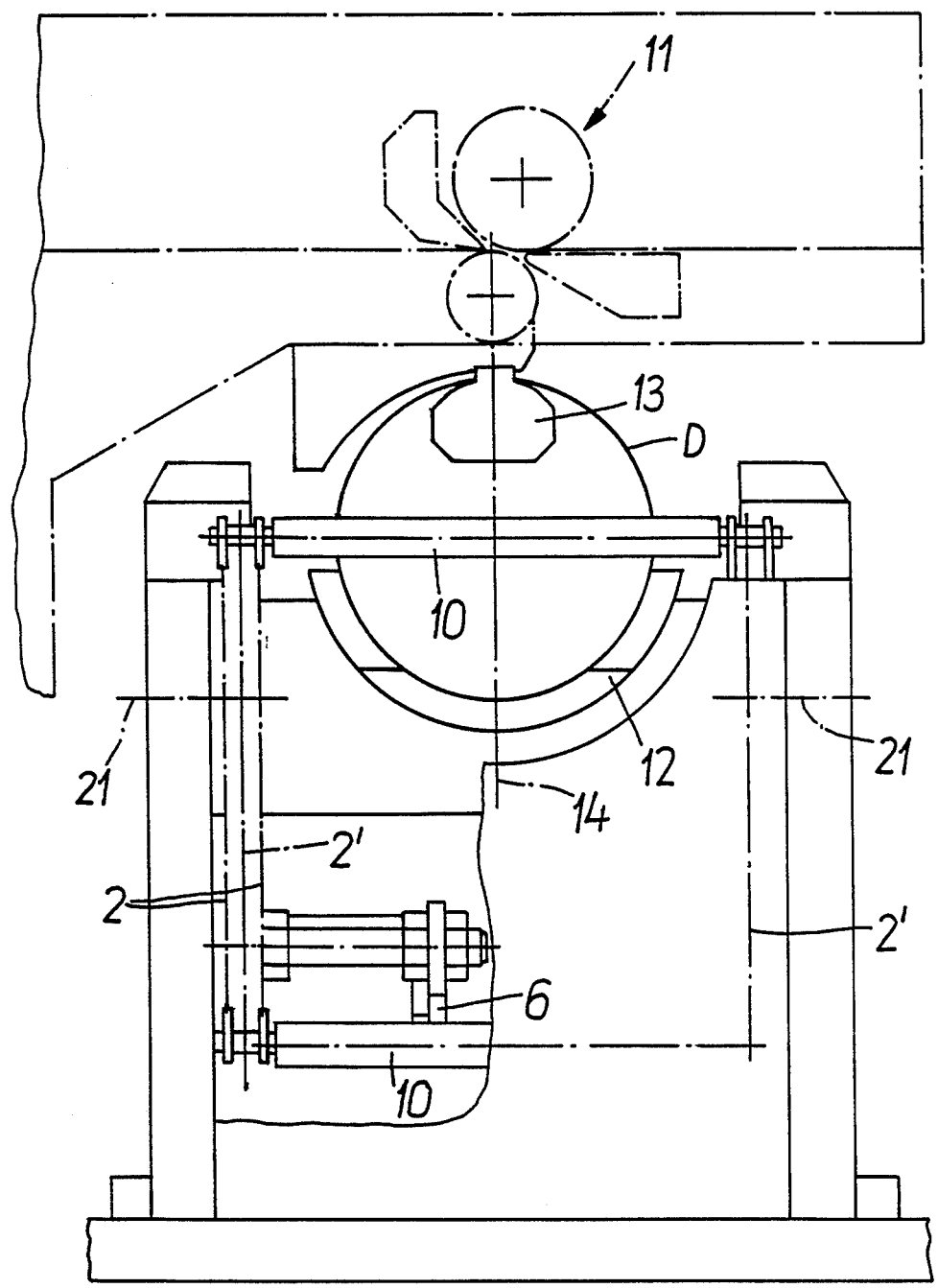
FIG. 4 is a schematic rear elevational view, partially broken away, of the preferred embodiment of invention.

Also referring to FIG. 4, the dogs 10 of the first advancing arrangement 1 revolve around and are spaced from a catch pan 12 which is disposed below a rounding apparatus 11. The can bodies D are deposited onto the catch pan 12 for a short-period dwell after they leave the rounding apparatus 11. A guide rail 13 disposed above the catch pan 12 serves to guide the can bodies D in the transporting direction T. The catch pan 12 can also be used to guide the can bodies D over part of their transporting path.

Figure 3:
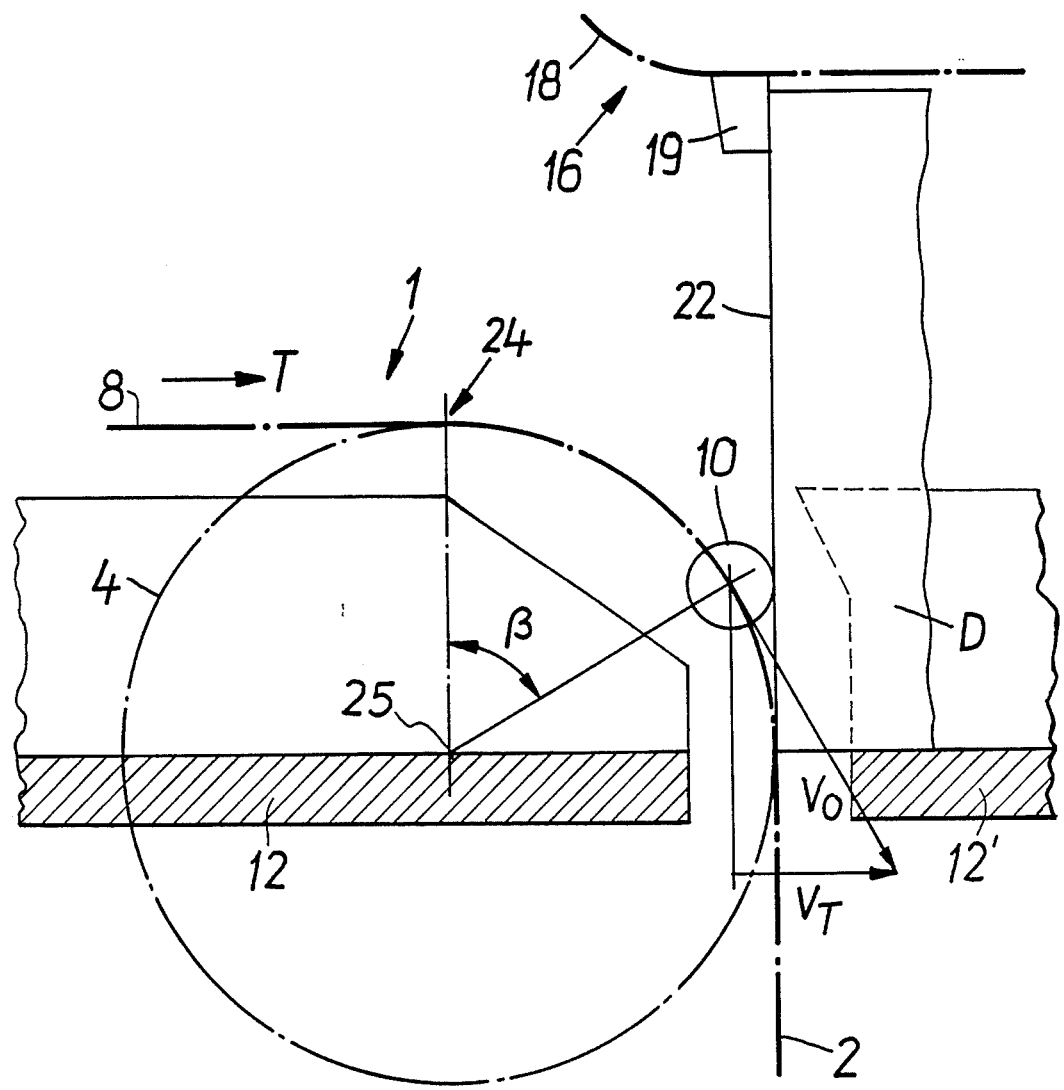
FIG. 3 is an enlarged diagrammatic side view of another part of preferred embodiment.

The substantially vertical planes 2' passing through the two chains 2 are mutually parallel and symmetrical with the common longitudinal vertical center plane 14 of the guide rail 13 and the catch pan 12. Another catch pan 12' is shown in FIG. 3 at the same level as the pan 12.

Reverting to FIG. 1, the second advancing arrangement 16 transports the can bodies D into, for example, a welding station (not shown) The second advancing arrangement 16 includes two chains 18 (only one shown) disposed on either side of the guide rail 13. The chains 18 are equipped with outwardly projecting catch fingers 19. For the purpose of synchronization, the drive mechanisms of the two advancing arrangements 1 and 16 are mechanically coupled to one another. The second advancing arrangement 16 operates with a transporting speed $v'_o$ which essentially corresponds to the welding velocity, while the first advancing arrangement 1 operates at a transporting speed $v_o$ which can be, for example, twice the speed $v'_o$ of the second advancing arrangement 16.

Figure 2:
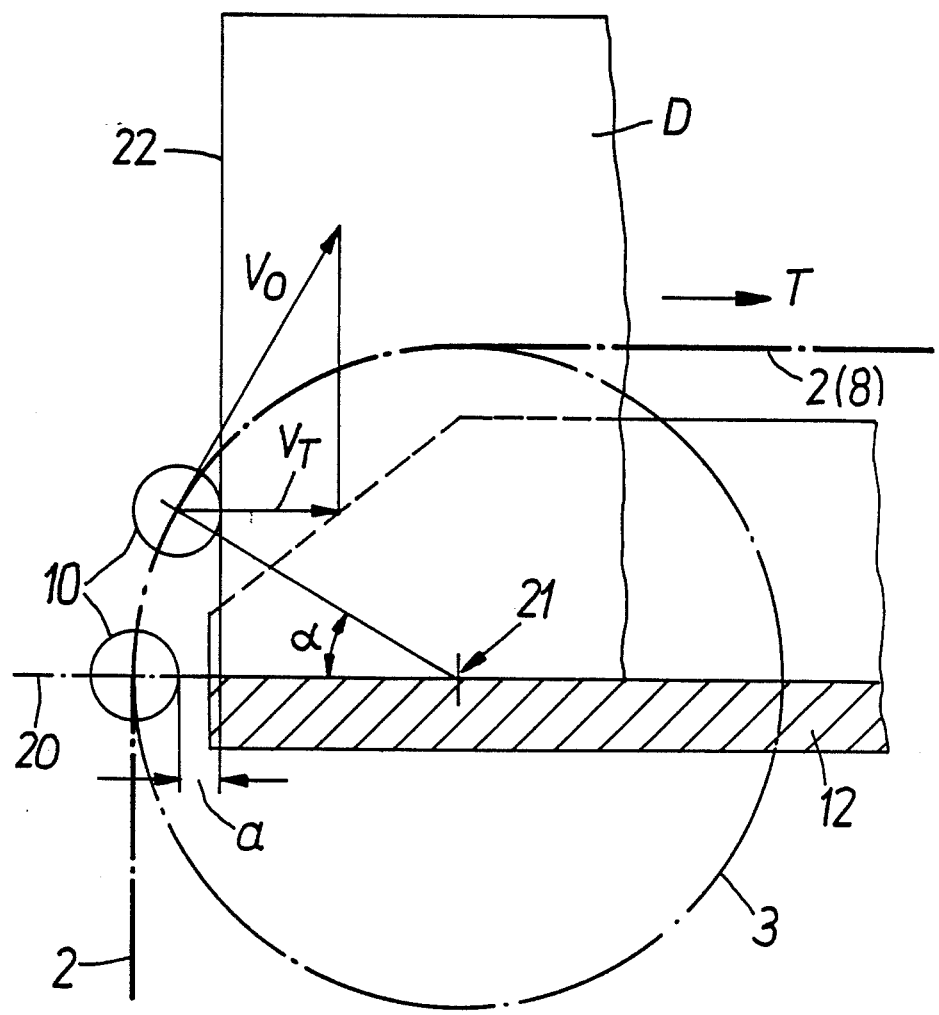
FIG. 2 is an enlarged diagrammatic side view of one part of the preferred embodiment of the invention.

With particular reference to FIGS. 1, 2 and 5, after the rounding operation is completed in the rounding apparatus 11, the can bodies D come to rest for a short time at a rest location in catch pan 12. The rounding apparatus 11 and the first advancing arrangement 1 are positioned relative to one another so when a dog 10 is disposed in a horizontal plane 20 which contains the axis of rotation 21 of the first guide wheel 3, the dog 10 is at a distance a (about 1 mm) from the rear surface, seen as an edge 22, of the can body D. Such a position of the dog 10 is at A in FIG. 5. The advancement of the can body D begins after further rotation of the dog 10 through an angle $\alpha$ at which time the dog 10 assumes position B in FIG. 5. Because the velocity component $v_T$ of the dog 10 in the transporting direction T at this small angle $\alpha$ is significantly smaller than the transporting or circumferential velocity $v_o$, the can body D is engaged gently by the dog 10. Further travel of the dog 10 about axis 21 in the transporting direction T causes an increase in the velocity component $v_T$ of the dog 10 and thus an increase in the transporting velocity of can body D until it reaches the full transporting velocity $v_o$. At that moment the dog 10 is situated at point C in FIG. 5.

The respective can body D is then transported along the first advancing arrangement 1 with a velocity component $v_T$ in the transporting direction T equal to the transporting speed $v_o$. Also referring now to FIG. 3, the velocity component $v_T$ of the dog 10 begins to decrease after the dog 10 has passed the point 24 which is the location where the upper run 8 and the second guide wheel 4 arrive into contact with one another. In FIG. 5, point E corresponds to point 24 of FIG. 3. The velocity component $v_T$ of the dog 10 continues to decrease until the can body D is transferred to the second advancing arrangement 16. This occurs after dog 10 has rotated about the axis of rotation 25 of the second guide wheel 4 over an angle $\beta$ of 60° from point 24. At that location which corresponds to point F in FIG. 5, the velocity component $v_T$ of dog 10 in the transporting direction T corresponds to half of the transporting velocity $v_o$ of the first advancing arrangement 1 and thus equals the full transporting velocity $v'_o$ of the second advancing arrangement 16. It is possible to utilize another ratio of the transporting velocities $v'_o/v_o$ and in doing so a correspondingly different rotation angle $\beta$ has to be chosen. As the dog 10 assumes its position in point F, the rear edge 22 of the can body D is contacted by a catch finger 19 of the second advancing device 16 and is transported in the direction toward a welding station on a supporting surface (neither shown).

At the instant of the transfer of the can body D from the first advancing arrangement 1 to the second advancing arrangement 16, the dog 10 and the catch finger 19 must simultaneously contact the rear edge 22 of can body D and thus should be positioned in vertical alignment with one another. This result may be achieved, for example, by providing an adjusting mechanism by means of which the advancing arrangements 1 and 16 are shiftable relative to one another in the transporting direction. Or, as an alternative, a clutch mechanism (not shown) may be provided which allows the chain pairs 2 and 18 of one of the advancing arrangements 1 or 16 to be idled around a defined angle of the respective drive wheel (e.g. drive wheel 5). The expression "rounded can bodies" used in this description should more precisely also be understood as generally tubular shaped blanks for can bodies.

It will be understood that the above description of the present invention is susceptible to various modifications, changes and adaptations, and the same are intended to be comprehended within the meaning and range of equivalents of the appended claims.

What is claimed is:

1. A conveyor apparatus for sequentially advancing articles along a predetermined path along a conveying direction in which, beginning at a starting location, the velocity of the article in the conveying direction is progressively and continuously increased until it reaches a first conveying velocity which remains substantially constant along the predetermined path until the article reaches a second location along the predetermined path, after which the velocity of the article diminishes continuously and smoothly to a second conveying velocity when the article reaches a third location, comprising:

(a) two substantially parallel endless pulling elements, a pair of spaced first end wheels having a first rotary axis, a pair of spaced second end wheels having a second rotary axis, each of said pulling elements being supported about a respective one of said first end wheels and a respective one of said second end wheels; each of said pulling elements having a working flight extending between the respective first and second end wheels which is oriented parallel to said conveying direction;

(b) a plurality of substantially parallel article advancing bars each having two ends connected respectively to each of said two pulling elements, each advancing bar being oriented substantially perpendicularly to said conveying direction;

(c) drive means for effecting travel of said pulling elements at the first conveying velocity along said working flight and with a circumferential velocity about each of said first and second end wheels which equals said first conveying velocity; and (d) a stationary article supporting surface extending in a direction which is substantially parallel to said conveying direction, said supporting surface having a portion which extends between said pair of first and second end wheels along the predetermined path beginning at said starting location and extending a fixed distance beyond said second end wheels in said conveying direction to said third location for supporting the articles as the articles are pushed along said article supporting surface in said conveying direction by respective ones of said article advancing bars; said starting location being disposed adjacent said pair of first end wheels for sequentially receiving the articles to be engaged by respective ones of said article advancing bars relative to said pair of first end wheels such that an article which is initially stationary and is located at said starting location is first contacted by an approaching one of said article advancing bars at an instant when said approaching one of said article advancing bars is moving at an angle to said conveying direction which is at most equal to 45°, such that, at said instant of contact between said respective article advancing bar and the article at said starting location, a velocity component in said conveying direction of said circumferential-velocity of said approaching one of said article advancing bars is at most approximately 71% of said first conveying velocity, and after said instant of contact said velocity component in said conveying direction of the one of said article advancing bars contacting the article progressively and continuously increases until reaching said first conveying velocity; when the respective one of said advancing bars advances the article to the second location, disposed adjacent said pair of second end wheels, the respective one of said advancing bars at said second location travels about said rotary axis of said second end wheels in a circumferential direction such that, beginning at said second location, the articles are advanced in said conveying direction at a progressively and continuously diminishing speed along said stationary article supporting surface until the article reaches the third location at which the velocity of the article in the conveying direction equals said second conveying velocity.

2. A conveyor apparatus as defined in claim 1, wherein said pulling elements are toothed belts.

3. A conveyor apparatus as defined in claim 1, wherein said angle relative to said conveying direction of said approaching one of said article advancing bars is at most approximately 15°, so that said velocity component of said approaching one of said article advancing bars is at most approximately 26% of said circumferential velocity of said approaching one of said article advancing bars at said instant of contact between said respective article advancing bar and the article dwelling in said starting location.

4. A conveyor apparatus as defined in claim 1, wherein said pulling elements are chains.

5. A conveyor apparatus as defined in claim 1, further comprising an additional conveyor having an input end and having article advancing dogs; said additional conveyor having a portion disposed adjacent said third location, said article advancing dogs having a velocity component in said conveying direction which is substantially equal to said second conveying velocity, said article advancing dogs being synchronized to contact the article when it is disposed at said third location at the instant at which the velocity of the article in the conveying direction equals said second conveying velocity, for taking over conveyance of each article from article advancing bars beginning at said third location.

* * * * *